United States Patent [19]

Webb et al.

[11] Patent Number: 4,511,994
[45] Date of Patent: Apr. 16, 1985

[54] MULTI-GROUP LRU RESOLVER

[75] Inventors: David M. Webb, Blaine; Thomas A. Lane, New Brighton, both of Minn.

[73] Assignee: Control Data Corporation, Minneapolis, Minn.

[21] Appl. No.: 424,665

[22] Filed: Sep. 27, 1982

[51] Int. Cl.³ .......................... G06F 7/00; G06F 7/38
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 3,737,881 | 6/1973 | Cordi et al. | 364/900 |
| 3,921,153 | 11/1975 | Belady et al. | 364/200 |
| 3,964,028 | 6/1976 | Belady et al. | 364/200 |
| 4,186,438 | 1/1980 | Benson et al. | 364/200 |
| 4,332,010 | 5/1982 | Messina et al. | 364/200 |
| 4,422,144 | 12/1983 | Johnson et al. | 364/200 |

Primary Examiner—Harvey E. Springborn
Attorney, Agent, or Firm—Edward L. Schwarz; Joseph A. Genovese

[57] ABSTRACT

A logic system maintains current least recently used information among the elements of each group in a plurality of groups where each group includes two or more elements. A memory stores intermediate information regarding the relative precedence between each combination of elements in a given group. A logic network recomputes this value each time an element in a group is used and provides this new information to the memory and to a network which resolves the current least recently used status.

3 Claims, 1 Drawing Figure

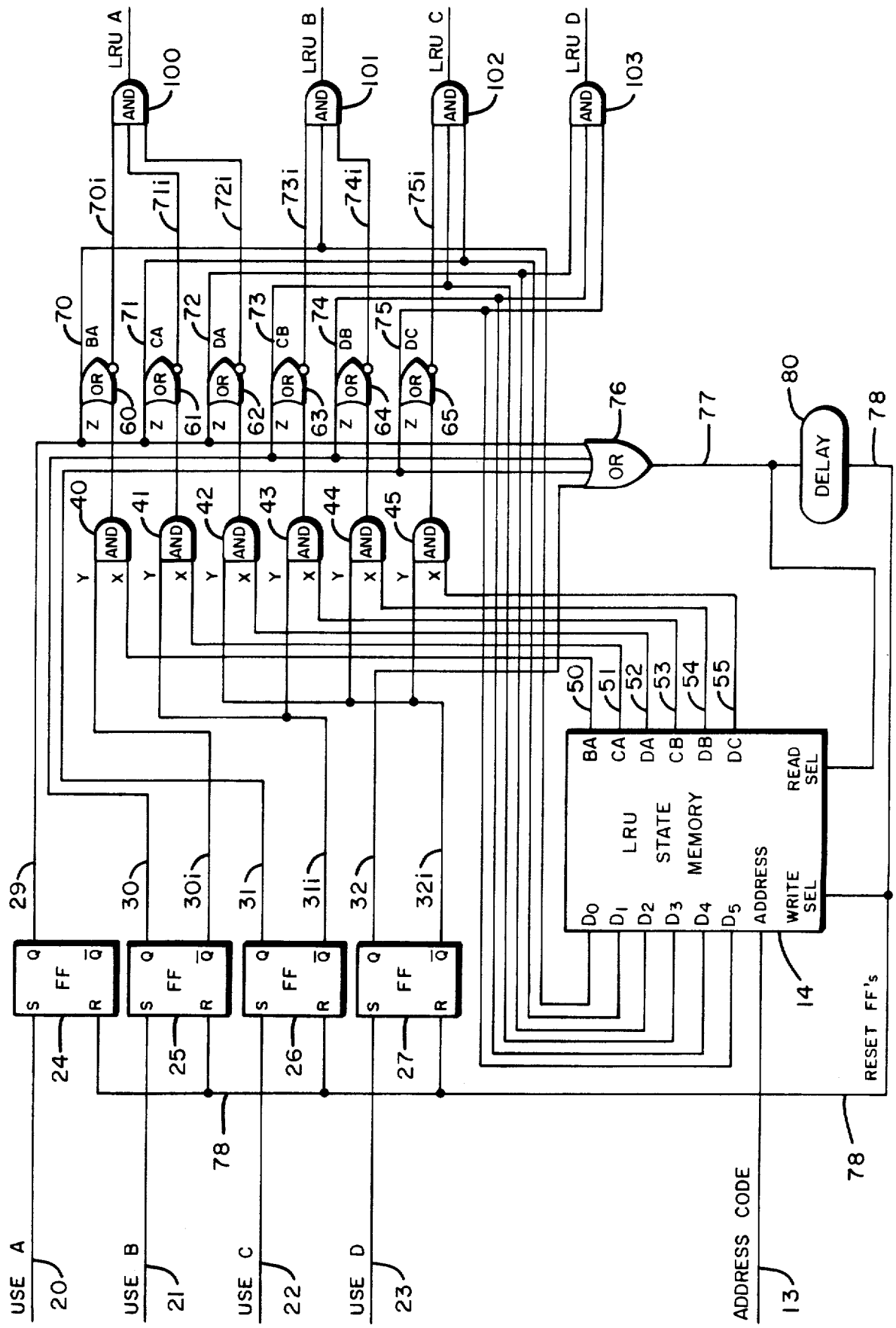

MULTI-GROUP LRU RESOLVER

BACKGROUND OF THE INVENTION

The least recently used (LRU) algorithm is typically the way that conflict for the use of a group of elements is resolved. That is, when all of a group of elements are occupied and a further demand for use of one of these elements is made, it is necessary to change the current dedication of one of these elements, and instead devote it to the new demands made on the group. The LRU algorithm specifies that in situations like this the element which has been unused for the longest time is the one to be devoted to this new use.

This situation arises most frequently in competing demands for various areas of a memory, each area essentially comprising a single element. Information is stored in an area for use by a processor. After all the elements contain current and useful information, a need for further information not contained in any of the elements cannot to be honored without replacing information currently held in one area or element with the information newly required. In this situation, the LRU algorithm simply specifies that the element which contains the information which was last used earliest in time relative to the information in the other elements, should be the information which is overwritten and destroyed. To accomplish this effectively, a memory must be used to record temporarily each use of an element's information. Typically, this has been done in the past simply by using individual memory flip-flops which receive signals indicating the use of a particular element and which change state when the later use of an element relevant to another element changes. This is shown for example, in our previous patent application entitled "Degradable LRU Circuit," Ser. No. 06/200,876, filed Oct. 27, 1980, now U.S. Pat. No. 4,361,878, and having a common assignee with this application.

In typical memory applications required now, there may be two or more sets of memory, each of which can be referenced separately. Each set is in turn subdivided into a number of areas or elements. It is desired to resolve the LRU status between a group of associated elements, one element in each group provided by each memory set. The use of a series of groups of flip-flops, where a single group of flip-flops is associated with each group of elements and receives the use signals from them is a clumsy and impractical solution to this requirement. Accordingly, there is substantial motivation to implement this function in a more efficient manner.

BRIEF DESCRIPTION OF THE INVENTION

We have developed an implementation which employs a semiconductor or other type of memory which stores the intermediate values corresponding to the outputs of the flip-flops receiving the use signals in our aforementioned patent application, Ser. No. 06/200,876. The number of words in the memory is equal to the number of groups of elements. Inputs to the memory are generated by a logic network which computes for each bit in a memory word, the logical value of an expression of the form (X AND Y) OR Z, where X is the current logical value of the memory bit involved, Y is the inverted logical value of a first use input line associated with the memory bit involved, and Z is the logical value of a second use input line associated with the memory bit involved, and wherein the first and second use input lines associated respectively with the Y and Z values form for each memory word bit a unique combination. Each memory word thus contains a number of bits equal to the combination of the number of elements in a group taken two at a time.

The logical values supplied by this logic network are supplied as input to the memory and also comprise the desired individual use relationships for the elements associated with that particular memory word. A known LRU resolving network can then supply the desired status. A different word in memory and having a unique address is associated with each group of elements. Control means provide gating for the signals supplied from and to the memory. When a use signal is supplied to the logic network, an address code must also be supplied with it to direct the memory to supply the current logical value of the word with which the group is associated.

Accordingly, one purpose of this invention is to simplify the accounting procedures involved in maintaining LRU status for a large number of groups of elements.

A second purpose is to provide such an LRU capability to operate with either a standard LRU resolving network or with the resolving network involving disableable elements, as shown in our patent application, Ser. No. 06/200,876 mentioned earlier.

BRIEF DESCRIPTION OF THE DRAWING

The FIGURE shows a logical schematic implementing a preferred embodiment of the invention.

DESCRIPTION OF THE PREFERRED EMBODIMENT

The system symbolized by the FIGURE will determine the LRU status among a plurality of groups of four elements, these elements being denominated A, B, C and D. Elements A-D are respectively associated with paths 20-23 labeled USE A *** USE D respectively and which carry the use input signal shown in the FIGURE corresponding to those carried on the similarly numbered signal paths shown in the Figure of Ser. No. 06/200,876. Note that only a single use input signal should be present during a single interval in which LRU status is resolved. These signals are applied to the set inputs of flip-flops 24-27. The Q outputs of each flip-flop 24-27 each indicate the occurrence of a use input signal on the use input path 20-23 connected to it when producing a logical 1. If a path 20-23 has not received a use input signal during an interval, the Q output of the associated flip-flop 24-27 will be logical 0. The duration of a particular signal on paths 20-23 is assumed to be long enough to set the flip-flop 24-27 receiving it but not so long as the signal delay times created by delay circuit 80, to be described later. The Q outputs of flip-flops 24-26 carried on paths 29-31 are applied to the inputs of OR gates 60-65 in a pattern to be described. The inverted or not-Q outputs of flip-flops 25-27, whose paths are denoted with the suffix i in the reference numbers assigned and hence numbered 30$i$-32$i$, are applied in a related but different pattern to AND gates 40-45. The not-Q outputs on paths 30$i$-32$i$ are always inverted logically respecting the Q outputs on paths 30-32. AND gates 40-45 each receive a different one of the output bits from the LRU state memory 14. The output of AND gates 40-45 together with the Q outputs of flip-flops 24-26 comprise the inputs to OR gates 60-65.

LRU state memory 14 records the current LRU relationship among each group of elements. Memory 14 holds N six bit words, the bits in each word numbered from 1–6 and for output, carried on paths 50–55 respectively. A first and a second element, or pairs of the use input lines 20–23 respectively associated with them can be paired to form a unique combination associated with each of the similarly numbered bits in memory 14. The notation BA within the box symbolizing memory 14 and adjacent to signal path 50 specifies one such combination and implies that a logical 1 on signal path 50 or in a memory 14 location corresponding to that signal path represents the fact that element A was used after element B, and therefore as between these two elements B should be selected for rededication to a new use rather than A. Similarily, for paths 51–55 the notations CA, DA, CB, DB, and DC implies that element A was used after element C was used, element A was used after element D was used, etc. if the bit corresponding to that notation is a logical 1. Of course, in every case if the bit so specified is a logical 0 then the opposite implication exists, i.e. if the signal carried on path 50 is a logical 0 at any time then it is implied that element B was used after element A.

The number of logic bits which must be carried in a single memory word to completely describe the previous use history at the current instant is simply the combination of the number of elements involved taken two at a time. For four elements taken two at a time this value is six as shown. In the general case each word of memory 14 comprises M bits which can be conveniently numbered 1 through M, where M is the combination of the number of elements in the largest group, taken two at a time.

The actual functioning of memory 14 is controlled by an address code carried on group address input line 13 and the write select and read select signals carried on paths 77 and 78. The address code must be supplied on line 13 in conjunction with each use signal on paths 20–23. When a pulse comprising a change in level from logical 0 to logical 1 is applied to the read select input of memory 14 on path 77, then the word contained in memory 14 at the address specified by the address code on line 13 is supplied on output paths 50–55 for a short period of time. The number of individual bit paths present in group address input line 13 is of course a function of the number of words N storable by memory 14. If memory 14 has 16 words (N = 16) then address code 13 will typically comprise four bits, as is well known in the art. N must be no smaller than the number of groups of elements. When one wishes to write the information carried on paths 70–75 into memory 14, a write signal comprising a change in the value from a logical 0 to a logical 1 is applied to path 78 along with the proper address code on line 13, causing the information on paths 70–75 to be written into memory 14. For this description it is assumed that memory 14 contains an address register which stores the address supplied with each use signal. A write select signal then clears the address register in memory 14 after the word has been stored.

The unique pair of elements associated with each path 50–55 and the memory bit connected to each of these paths is also associated with the corresponding AND gate 40–45 which receives the output on paths 50–55 respectively from memory 14. That is, AND gate 40 is associated with elements B and A, AND gate 41 is associated with elements C and A, etc. AND gates 40–45 form the logical AND of the logical value of the associated bit of the memory 14 word and the inversion of the logical value of the use input line of the element mentioned first in the element pair referenced. It is convenient to annotate this function with the convention that X refers to the related bit of the memory 14 word and Y refers to the inverted value of the use input line associated with the AND gate involved. Since all the inverted use input line signal values are conveniently supplied by the not-Q outputs of flip-flops 24–27, this means that for AND gate 40, the Y value is supplied by the not-Q output of flip-flop 25 carried on path 30*i*, which is the inverted logical value of the use signal supplied for element B and carried on path 21. That is, if no pulse (logical 0) was supplied on path 21 indicating that element B was not used, then the not-Q output is a logical 1. Similarly, for AND gate 41 which is associated with the logical value of the memory 14 bit carried on path 51 for the combination of elements C and A, the inverted Q output of flip-flop 26 on path 31*i* forms the Y input for AND gate 41. As a further explanation, for AND gate 45, the logical value of the memory 14 bit supplied on path 55 and which indicates the relative LRU status of elements D and C, forms the X input and the inverted output of flip-flop 27 (which receives as input the signal on path 23 indicating use of element D) supplies the Y input on path 32*i*.

The outputs of AND gates 40–45 form one of the inputs respectively for each of the OR gates 60–65. The second or Z inputs of OR gates 60–65 come from various of the Q or uninverted values of the use pulses for the elements A–D as stored in flip-flops 24–27. To state the rule generally for selection of the Z input source to each OR gate 60–65, consider each AND gate 40–45 to form an AND-OR gate pair with the OR gate 60–65 to which it supplies an input. The Z input for any OR gate 60–65 is supplied by the Q output of the flip-flop 24–27 whose use signal input designation is paired in the memory 14 bit designations with the use signal input to the flip-flop 24–27 supplying the X input to the AND gate 40–45 of the AND-OR gate pair involved. Thus, one skilled in the art can see that the true output on paths 70–75 of each OR gate 60–65 is of the form (X AND Y) OR Z where X is the current logical value of memory 14 bit on paths 50–55 involved, Y is the inverted logical value of the use signal on one use input line associated with the memory bit involved, and Z is the logical value of the use signal on a different use input line associated with the memory bit involved, and wherein each pair of use input lines associated with the Y and Z values form for each memory 14 bit line 50–55 a unique combination. The normal or true logical values from OR gates 60–65 are supplied as inputs on paths 70–75 respectively to the D0–D5 inputs of memory 14. The logical values carried on paths 70–75 and supplied as input to the memory also comprise the desired individual use history relationship for the elements associated with the address code originally supplied to the memory as modified by the most recent signal on a use input line 20–23.

To resolve the use history of the several groups of elements, it is necessary to store the bits encoding the current individual use history relationship at the end of each determination or resolution of it for a group, and also to retrieve these bits when another use of an element of the group occurs. The Q outputs of flip-flops 24–27 form inputs to an OR gate 76. When a use of an element occurs, one of these outputs changes from a logical 0 to a logical 1, changing the output of OR gate 76 from a logical 0 to a logical 1. This logical value change is applied via path 77 to the read select control input of memory 14. As explained earlier this causes memory 14 to place its contents specified by the address on path 13, on the data paths 50–55, where they are available at the X inputs of AND gates 40–45. (Recall that each use signal is accompanied by an address code on path 13 specifying the address in memory 14 which contains the use history of the group of elements of which the element generating the use signal is a member.) Delay 80 then delays the logical 1 generated by OR gate 76 a period of time sufficient for AND gates 40–45 and OR gates 60–65 to produce the new use history relationship on paths 70–75. After this time, usually much less than 1 $\mu$sec., the change from logical 0 to logical 1 is applied via path 78 to the write select control input of memory 14, causing the new use history relationship represented by the outputs of OR gates 60–65 on paths 70–75 to be stored in memory 14 at the location still specified by the data on group address input line 13. Memory 14 must provide its outputs on paths 50–55 for a time sufficient for AND gates 40–45 and OR gates 60–65 to generate the new use history relationship and supply it at the $D_0$–$D_5$ inputs of memory 14 at the time that the 0 to 1 logic level change on path 78 occurs.

The 0 to 1 logical level change on path 78 is applied to the R or reset terminals of flip-flops 24–27 as well, setting all their Q outputs to a logical 0. It is reasonable to assume that the inherent delay times present in flip-flops 24–27, AND gates 40–45 and OR gates 60–65 is sufficient to prevent any change in the use history relationship data on paths 70–75 before memory 14 has stored these values. If this is not true, then a second delay circuit must be interposed between the write select input of memory 14 and the R terminals of flip-flops 24–27. This second delay circuit generates a further delayed pulse to clear flip-flops 24–27 after the new LRU data on paths 70–75 has been stored in memory 14 at the address specified originally on line 13.

It should again be mentioned that the output of OR gates 60–65 will be erroneous if more than one use signal is received by flip-flops 24–27 during the aforementioned sequence. It is assumed that logic circuitry upstream from paths 20–23 will assure that only a single use input pulse is presented on paths 20–23 at a time.

The output of OR gates 60–65 on paths 70–75 and 70$i$–75$i$ are supplied to AND gates 100–103 for resolution of the actual LRU situation. This is wholly conventional and is shown in our aforementioned application Ser. No. 06/200,876 as well as for example in *Computer Storage Systems and Technology*, page 596, Richard Matick, 1977 John Wiley and Sons. The reference numerals for AND gate 100–103 have the same values as the corresponding AND gates in our aforementioned application.

The added capability of withdrawing one or more of the use input lines 20–23 from consideration is possible for this apparatus by simply adding the disable flip-flops 40–43 and the OR gates 60–71 displayed in the aforementioned Ser. No. 06/200,876. In addition, to prevent an improper memory 14 read and write, the output of flip-flops 24–27 would have to be gated to OR gate 76 under the control of the set outputs of flip-flops 40–43 of Ser. No. 06/200,876.

What is claimed is:

1. In a least recently used resolving network of the type having a group address input line for receiving an address code and a plurality of use input lines, each use input line having associated with it a plurality of elements, one element from each plurality of elements being associated in an elemental group with one element from each of the other pluralities of elements, each said elemental group having associated with it a unique address code supplied on the group address input line each time an element in the group is used, a single one of the use input lines receiving in conjunction with each address code a use signal indicating use of the element associated with the use input line carrying the use signal, for resolving and recording the individual use relationships among the elements of each group and comprising:

(a) a memory storing N words, each word having bits numbered 1 through M, where N is the greatest number of elements associated with any use input line and M is the combination of the number of use input lines taken two at a time, said memory having an input line forming the group address input line, read and write select lines, and a data input line and output line for each memory bit, and storing the data present on the data input lines at the address on the group address input line responsive to a write signal on the write select line, and providing at the data output lines for a predetermined period the data stored at the location specified by the address present on the group address input line responsive to a signal on the read select line, and each similarly numbered bit is associated with first and second use input lines forming a unique combination for each set of differently numbered bits;

(b) logic network means receiving as input the signals carried by the use input lines and the memory contents received responsive to a read select signal, for supplying on the memory input lines for each of the bits 1 through M of the memory words the logical value of the expression (X AND Y) OR Z where X is the current logical value in the memory word supplied responsive to the read select signal of the memory bit involved, Y is the inverted logical value present in any use signal carried on the first use input line associated with the memory bit involved, and Z is the logical value present in any use signal carried on a second use input line associated with the memory bit involved, and wherein the logical values supplied as input to the memory comprise the desired individual use history relationship for the elements of the group associated with the address code supplied to the memory, as modified by the most recent signal on a use input line; and (c) control means receiving the use signals on the use input lines, for supplying to the memory a read select signal responsive thereto and a write select signal a predetermined interval following the read select signal.

2. The apparatus of claim 1 wherein the logic means further comprises (a) a plurality of flip-flops having Q and not-Q outputs and wherein every use input line is connected to a set input of a single one of the flip-flops;

(b) a plurality of AND gates each associated with a memory bit and receiving at one input the memory output for that bit and receiving at a second input the not-Q output of the flip-flop connected to the use input line supplying the Y-related inverted logical value associated with the memory bit involved; and (c) a plurality of OR gates, each associated with a memory bit and receiving at one input the output of the AND gate associated with the same memory bit and at another input the Q output of the flip-flop connected to the use input line supplying the Z-related logical value associated with the memory bit involved.

3. The apparatus of claim 2, wherein the control means further includes means for supplying a clear signal to the reset terminal of each flip-flop when each write select signal is generated.

* * * * *